United States Patent
Falkenstein, Jr.

(10) Patent No.: US 11,296,776 B2
(45) Date of Patent: **\*Apr. 5, 2022**

(54) MULTI-SPECTRUM ACCESS NODE

(71) Applicant: Comcast Cable Communications, LLC, Philadelphia, PA (US)

(72) Inventor: Kenneth D. Falkenstein, Jr., West Chester, PA (US)

(73) Assignee: Comcast Cable Communications, LLC, Philadelphia, PA (US)

(\*) Notice: Subject to any disclaimer, the term of this patent is extended or adjusted under 35 U.S.C. 154(b) by 18 days.

This patent is subject to a terminal disclaimer.

(21) Appl. No.: 16/705,006

(22) Filed: Dec. 5, 2019

(65) Prior Publication Data

US 2020/0259550 A1    Aug. 13, 2020

Related U.S. Application Data

(63) Continuation of application No. 14/542,139, filed on Nov. 14, 2014, now Pat. No. 10,541,744.

(51) Int. Cl.
| | |
|---|---|
| *H04B 7/15* | (2006.01) |
| *H01Q 21/28* | (2006.01) |
| *H01Q 21/06* | (2006.01) |
| *H04W 84/22* | (2009.01) |
| *H04W 84/12* | (2009.01) |
| *H04W 88/16* | (2009.01) |

(52) U.S. Cl.
CPC ............ *H04B 7/15* (2013.01); *H01Q 21/065* (2013.01); *H01Q 21/28* (2013.01); *H04W 84/12* (2013.01); *H04W 84/22* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,849,216 B2 | 12/2010 | Gong et al. | |
| 8,009,562 B2 | 8/2011 | Rayment et al. | |
| 8,041,333 B2 | 10/2011 | Hansen et al. | |
| 8,761,100 B2 | 6/2014 | Negus et al. | |

(Continued)

FOREIGN PATENT DOCUMENTS

| | | |
|---|---|---|
| WO | 2013/170169 A2 | 11/2013 |
| WO | 2014/116657 A1 | 7/2014 |

OTHER PUBLICATIONS

"Wireless LAN at 60GHz—IEEE 802.11 ad Explained", Agilent Technologies, 2013, 28 pages.
(Continued)

*Primary Examiner* — Jeffrey M Rutkowski
*Assistant Examiner* — Basil Ma
(74) *Attorney, Agent, or Firm* — BakerHostetler

(57) ABSTRACT

Systems and methods for managing a network are disclosed. In an aspect, a method can comprise receiving first information by an access node of a premises network via a first radio frequency band. At least a portion of the first information can be transmitted via a second radio frequency band to a gateway node of the premises network. Second information can be received from the gateway node via the second radio frequency band. At least a portion of the second information can be transmitted via the first radio frequency band to a source of the first information.

25 Claims, 9 Drawing Sheets

(56) References Cited

U.S. PATENT DOCUMENTS

| | | |
|---|---|---|
| 2009/0232049 A1 | 9/2009 | Singh et al. |
| 2009/0323621 A1 | 12/2009 | Touboul et al. |
| 2012/0092984 A1 | 4/2012 | Mighani et al. |
| 2012/0257585 A1 | 10/2012 | Sydor et al. |
| 2014/0204846 A1* | 7/2014 | Maltsev ............... H04B 7/1555 370/329 |
| 2016/0007351 A1* | 1/2016 | Shiotani .................. H04W 4/70 370/329 |
| 2016/0029384 A1* | 1/2016 | Sidhu ................ H04W 72/0453 370/329 |

OTHER PUBLICATIONS

Matthew Gast. 802.11 Wireless Network: The Definitive Guide. 2nd Edition 2005.

Yang, "60GHz: Opportunity for Gigabit WPAN and WLAN Convergence", 2009, 39(1), 56-61.

* cited by examiner

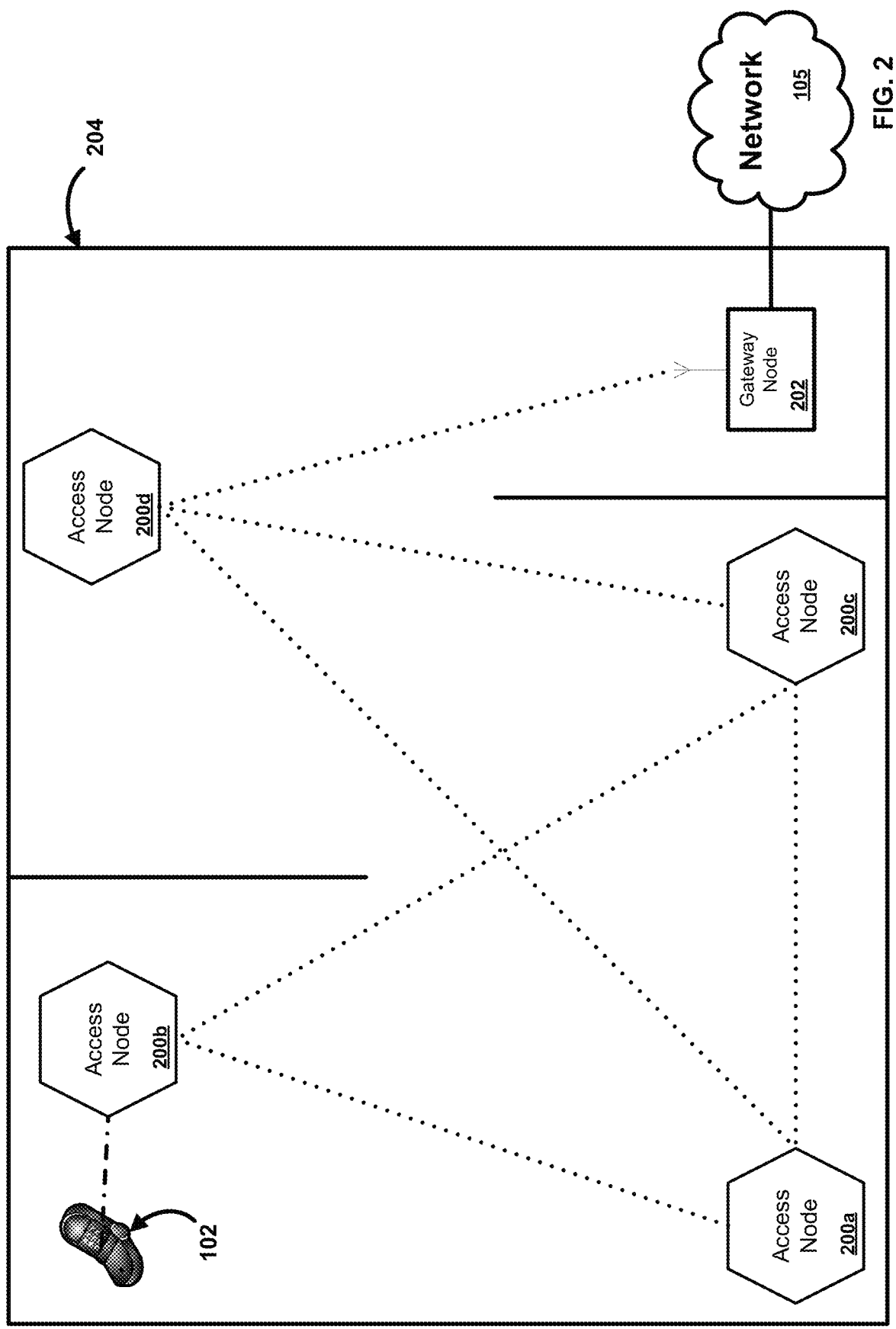

MULTI-SPECTRUM ACCESS NODE

CROSS REFERENCE TO RELATED APPLICATIONS

This application is a continuation of U.S. patent application Ser. No. 14/542,139, filed Nov. 14, 2014, which is hereby incorporated by reference in its entirety.

BACKGROUND

A network such as a local area network can comprise an access point (AP) to provide a means for one or more user devices to communicate with and/or over the network. An access point can comprise a device that allows wired and/or wireless user devices to connect to a wired network using Wi-Fi, Bluetooth, or other standards or protocols. An access point can be configured to provide access to one or more services (e.g., network-related services via a private network or public network). One or more access points can be deployed to provide an in-premises wireless network, such as a residential or business network environment.

SUMMARY

It is to be understood that both the following general description and the following detailed description are exemplary and explanatory only and are not restrictive. In-premises wireless networks often have unreliable signal coverage due to signal attenuation and blockage from internal structures, such as walls. These and other shortcomings are addressed by the present disclosure.

In an aspect, a method can comprise receiving or accessing first information by an access node of a premises network. The first information can be received or accessed via a first radio frequency band. The access node facilitates access to a second network by a source of the first information. At least a portion of the first information can be transmitted via a second radio frequency band to a gateway node of the premises network. The second radio frequency band can be different from the first radio frequency band. The gateway node can be in communication with the second network and can be configured to transmit at least the portion of the first information to the second network. Second information can be received from the gateway node via the second radio frequency band. At least a portion of the second information can be sourced from the second network. At least a portion of the second information can be transmitted to a source of the first information via the first radio frequency band.

In another aspect, an access node can comprise a housing having a first face disposed opposite a second face, a first phased array antenna disposed adjacent the first face, and a first planar antenna array disposed adjacent a third face between the first face and the second face. A processor can be disposed in the housing and configured to manage one or more radio frequency signals transmitted and received by the first phased array antenna and the first planar antenna array.

In yet another aspect, a method can comprise receiving first information by a first access network node of a plurality of access nodes configured in a mesh network. The first information can be received via a first radio frequency band. At least a portion of the first information can be transmitted via a directional transmission in a second radio frequency band to a gateway node of the mesh network. Interference affecting the directional transmission can be detected. The directional transmission can be adjusted to reduce the effect of the detected interference on the transmission of at least the portion of the first information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is a block diagram of an example system and network;

DETAILED DESCRIPTION

The methods and systems described herein, in one aspect, can provide services (e.g., network access, broadband services, etc.) to one or more user devices or clients. As an example, one or more nodes, such as an access node and/or a gateway node, can be deployed in a premises (e.g., home, business, building, enclosure, etc.) to form at least part of a first network such as a wireless local area network. The access nodes can comprise a mobile form factor and can be configured in various positions throughout the premises to form a mesh network. The gateway node can be configured as a node of the mesh network and to serve as a gateway between the mesh network formed by the access nodes and a second network such as a wide area network (e.g., Internet). Wireless communication between a user device and the access nodes can be provided using a first radio frequency band (e.g., 2.4 GHz and 5 GHz) and can implement a wireless communication protocol such as 802.11n/ac. The access nodes can be configured to communicate with each other and/or with the gateway nodes over a second radio frequency band (e.g., 60 GHz, extremely high frequency (EHF), millimeter wavelength) to form a mesh backhaul and can leverage mesh network communication protocols such as 802.11s to automatically interconnect multiple access nodes. As such, wireless network coverage of the premises can be maximized and capacity on multiple radio frequency bands can be leveraged to manage network traffic.

Figure 1:
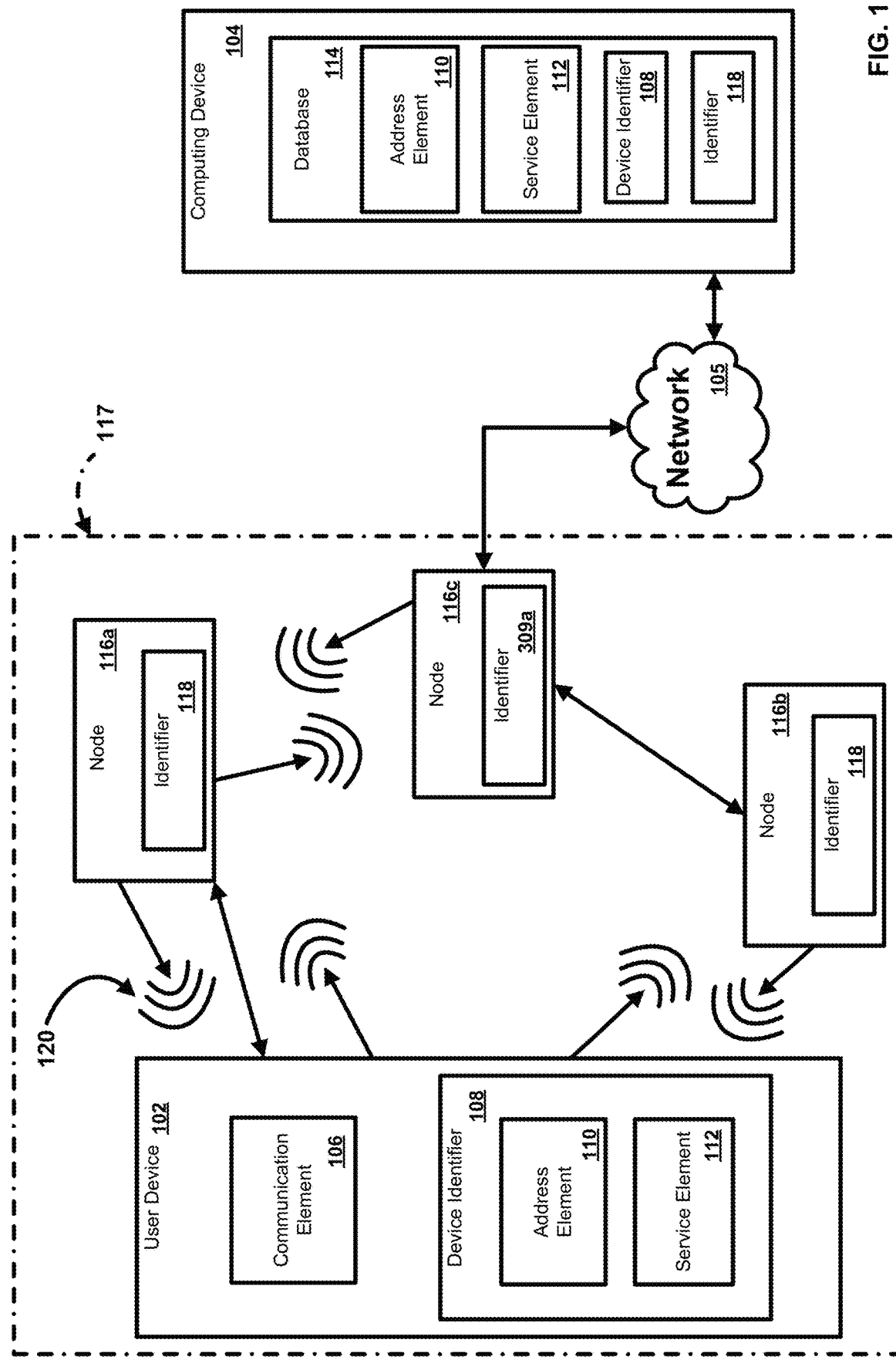
FIG. 1 is a block diagram of an example system and network.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or other networks (e.g., wide area networks). Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback such as a application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., mapped identifiers, relational tables, user device identifiers (e.g., identifier 108) or records, network device identifiers (e.g., identifier 118), or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing device 104 or some other device or system.

In an aspect, one or more nodes 116a, 116b, 116c can be configured as at least part of a network 117. The network 117 can be configured as a mesh network. Each of the nodes 116a, 116b, 116c can communicate with each other via wired or wireless communication. As an example, one or more of the nodes 116a, 116b, 116c can communicate with each wirelessly via a radio frequency band (e.g., 60 GHz). As another example, one or more of the nodes 116a, 116b, 116c can be in communication with another network such as the network 105. As an example, one or more of the nodes 116a, 116b, 116c can facilitate the connection of a device, such as user device 102, to the network 105. As a further example, a node 116c can be configured as a network gateway node to facilitate communication between the network 117 and the network 105. Any of the nodes 116a, 116b, 116c can be configured as a gateway node. One or more nodes 116a, 116b, 116c can be configured as an access node to allow one or more wireless devices (e.g., user device 102) to join network 117 using Wi-Fi, Bluetooth, or similar standard. As an example, the user device 102 can communicate with one or more nodes 116a, 116b, 116c wirelessly via a radio frequency band (e.g., 2.4 GHz, 5 GHz, etc.).

In an aspect, one or more nodes 116a, 116b, 116c can comprise an identifier 118. As an example, one or more identifiers can be a media access control address (MAC address). As a further example, one or more identifiers 118 can be a unique identifier for facilitating communications on the physical network segment. In an aspect, each of the nodes 116a, 116b, 116c can comprise a distinct identifier 118. As an example, the identifiers 118 can be associated with a physical location of the nodes 116a, 116b, 116c.

In an aspect, a beacon 120 can be transmitted (e.g., wirelessly) by one or more nodes 116a, 116b, 116c. The beacon 120 can comprise one or more beacon frames. The beacon 120 can comprise information to facilitate a connection between the user device 102 and the nodes 116a, 116b, 116c. The beacon 120 can be broadcast via a first radio frequency band (e.g., 2.4 GHz, 5 GHz, etc.) to be discovered by the user device 102, when the user device 102 is within a particular range. Once the user device 102 discovers the beacon 120, the user device 102 can join the network 117, for example, by completing an authentication operation or hand-shaking operation. The user device 102 can then continue to transmit and receive data over the first radio frequency band. In certain aspects, the data transmitted by the user device 102 can be intended for another network (e.g., network 105) or a destination outside of the network 117. As such, the nodes 116a, 116b, 116c can pass the data received by the user device 102 through the network 117 to a destination outside of network 117, such as network 105. Communication between the nodes 116a, 116b, 116c can be via a second radio frequency band (e.g., EHF, 60 GHz), different from the first radio frequency band. As another example, the nodes 116a, 116b, 116c can communicate with each other using directional beamforming, as described in more detail herein.

FIG. 2 depicts a plurality of access nodes 200a, 200b, 200c, 200d, configured as a wireless mesh network, for example, with each other and a gateway node 202. The wireless mesh network can be deployed at a premises 204 such as an enclosure, home, business, or building, an outdoor area, etc. Other deployments can be used. In an aspect, one or more of the nodes 116a, 116b, 116c (FIG. 1) can be configured to operate as the access nodes 200a, 200b, 200c, 200d to provide an access point for a wireless device such as user device 102 to connect to the network 105. In an aspect, one or more of the nodes 116a, 116b, 116c (FIG. 1) can be configured to operate as the gateway node 202 to provide communication between the network 105 and the access nodes 200a, 200b, 200c, 200d. As an example, the user device 102 can be configured to communicate with one or more access nodes 200a, 200b, 200c, 200d wirelessly via a first radio frequency band (e.g., 2.4 GHz, 5 GHz, etc.). The user device 102 can then continue to transmit and receive data over the first radio frequency band. In certain aspects, the data transmitted by the user device 102 can be intended for network 105. As such, the access nodes 200a, 200b, 200c, 200d can pass the data (e.g., payload intended for network 105) received by the user device 102 to the gateway node 202, which can pass the data to the network 105.

The access nodes 200a, 200b, 200c, 200d can communicate data between each other via a second radio frequency band (e.g., EHF, 60 GHz), different from the first radio frequency band. The access nodes 200a, 200b, 200c, 200d can also communicate with the gateway node 202 via the second radio frequency band. For example, then data is received from the user device 102 via the first radio frequency band, the receiving one of the access nodes 200a, 200b, 200c, 200d can wrap the data with information (e.g., header) to facilitate proper routing to the other access nodes 200a, 200b, 200c, 200d and/or the gateway node 202. Such information can be unique to the backhaul routing of data to the gateway node 202 and can be exclusively transmitted via the second frequency band. Other information, such as command and control information, can be transmitted via the second frequency band between the access nodes 200a, 200b, 200c, 200d and/or the gateway node 202 to manage the backhaul communications and routing of payload data. In an aspect, the communication via the second frequency band can be directional communication, such as through beamforming techniques using a phased array antenna. As an example, each of the access nodes 200a, 200b, 200c, 200d and the gateway node 202 can be configured to transmit and/or receive radio signals via directional transmission (e.g., beam(s), signal(s), etc.). Such a transmission can be directed to minimize signal interference, for example, by physical barriers such as walls, moving objects or people, and/or signal inferences.

Figure 3A:
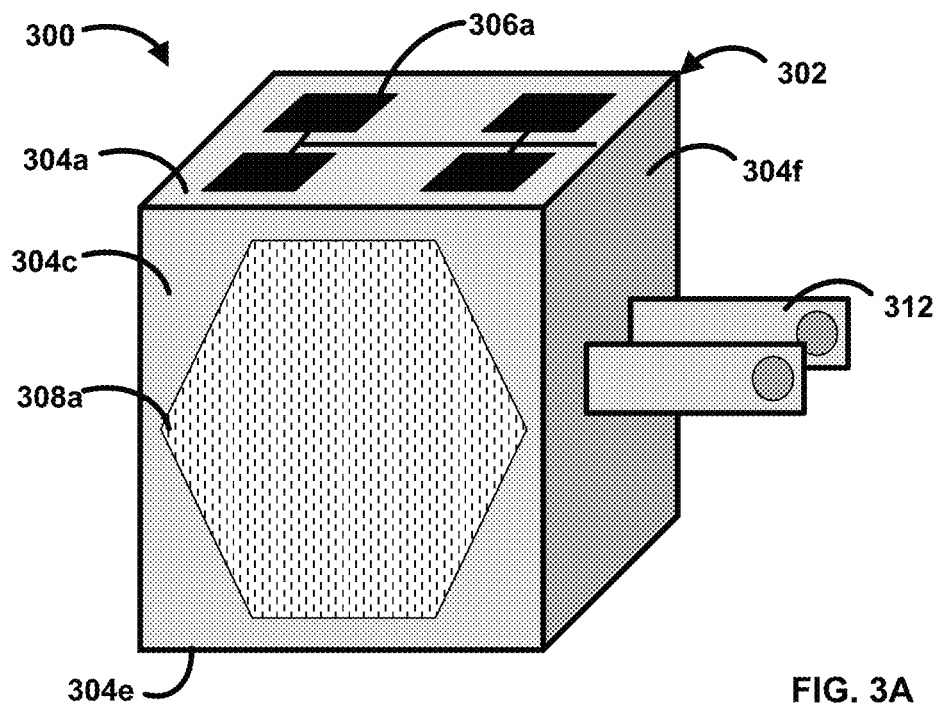
FIG. 3A is a diagrammatic side perspective view of an example node.
Figure 3B:
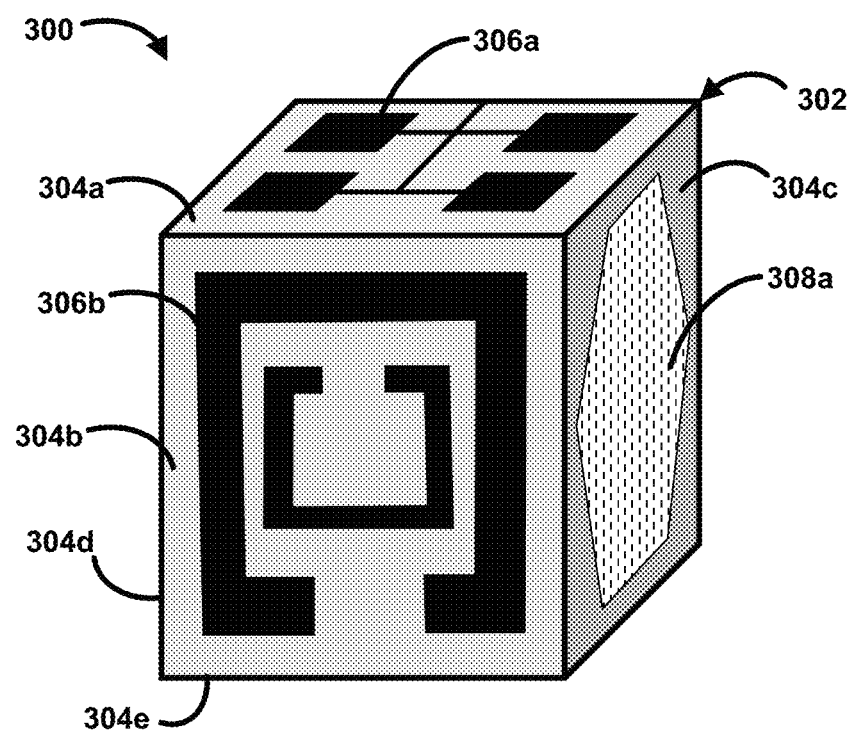
FIG. 3B is a diagrammatic front perspective view of the node of FIG. 3A.
Figure 3C:
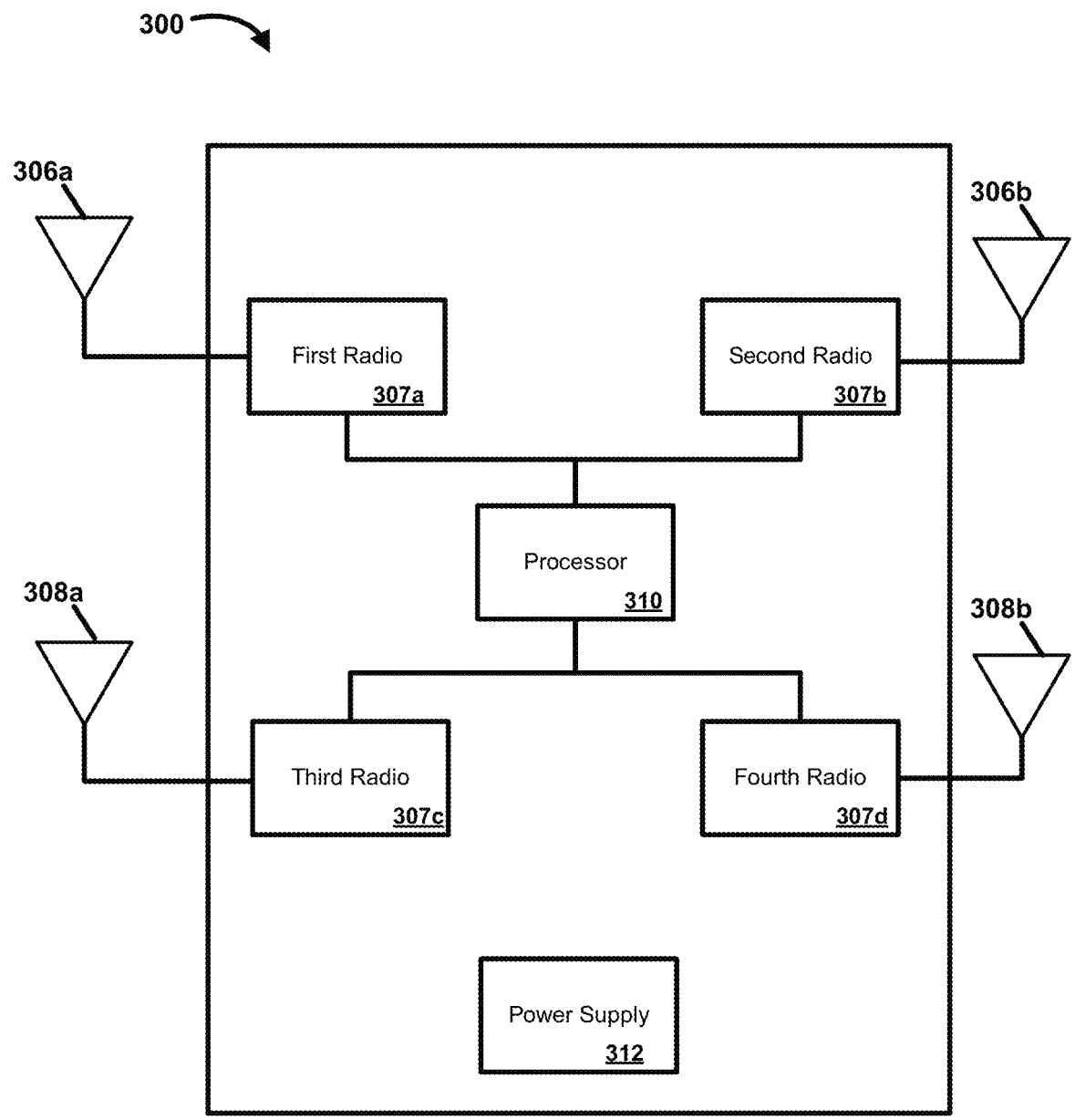
FIG. 3C is a block diagram of the node of FIG. 3A.

FIGS. 3A-3C illustrate an example node 300 according to an aspect of the present disclosure. One or more of the nodes 116a, 116b, 116c (FIG. 1) can be configured as the node 300. One or more of the nodes 300 can be configured as a mesh network, for example an in-premises network. Other configurations and networks can make use of the node 300. The node 300 can comprise a housing 302 having a plurality of faces 304 (shown as 304a-304f). As an example, the housing 302 can have a portable (e.g., relocatable) form factor and can be disposed in various positions throughout a premises. As a further example, the housing 302 can have a cubical shape with the faces 304 disposed opposite one another. Other shapes and configurations can be used and can include any number of faces.

The node 300 can comprise a first planar antenna array 306a. The first planar antenna array 306a can be disposed adjacent the first face 304a of the housing 302. The first planar antenna array 306a can be configured to transmit and receive radio frequency signals within a first radio frequency band. As an example, the first planar antenna array 306a can be configured to transmit and receive radio frequency signals at about 2.4 GHz or about 5 GHZ, such as in accordance with the 802.11n/ac protocols. As a further example, a first radio 307a can be disposed in the housing 302 and in communication with the first planar antenna array 306a. The first radio 307a can be configured to cause transmission of a radio frequency signal via the first planar antenna array 306a in a frequency band comprising about 2.4 GHz or about 5 GHZ.

The node 300 can comprise a second planar antenna array 306b. The second planar antenna array 306b can be disposed adjacent a second face 304b of the housing 302. The second face 304b can be adjacent the first face 304a. However, other configurations can be used. The second planar antenna array 306b can be configured to transmit and receive radio frequency signals within a first radio frequency band. As an example, the second planar antenna array 306b can be configured to transmit and receive radio frequency signals at about 2.4 GHz or about 5 GHZ. As a further example, a second radio 307b can be disposed in the housing 302 and in communication with the second planar antenna array 306b. The second radio 307b can be configured to cause transmission of a radio frequency signal via the second planar antenna array 306b in a frequency band comprising about 2.4 GHz or about 5 GHZ. The first radio 307a and the second radio 307b can manage the same or different radio frequencies or frequency bands. As an example, the first radio 307a can facilitate transmission and reception of radio signals via the first planar antenna array 306a at about 2.4 GHz and the second radio 307b can facilitate transmission and reception of radio signals via the second planar antenna array 306b at about 5 GHz. Other frequencies and configurations of the node can be used.

The node 300 can comprise a first phased array antenna 308a. The first phased array antenna 308a can be disposed adjacent a third face 304c of the housing 302. The third face 304c can be disposed adjacent one or both of the first face 304a and the second face 304b of the housing 302. Other facial configurations can be used. The first phased array antenna 308a can be configured to transmit and receive radio frequency signals within a second radio frequency band. The second radio frequency band can be the same or different from the first radio frequency band. As an example, the first phased array antenna 308a can be configured to transmit and receive radio frequency signals at extremely high frequency (EHF) bands, such as a band including about 60 GHz. As a further example, a third radio 307c can be disposed in the housing 302 and in communication with the first phased array antenna 308a. The third radio 307c can be configured to cause transmission of a directional radio frequency signal via the first phased array antenna 308a in a frequency band comprising EHF such as 60 GHz. The third radio 307c can be configured to adjust the phased transmission of radio signals via the first phased array antenna 308a to control beamforming for signal reception and/or transmission.

The node 300 can comprise a second phased array antenna 308b. The second phased array antenna 308b can be disposed adjacent a fourth face 304d of the housing 302. The fourth face 304d can be disposed adjacent one or both of the first face 304a and the second face 304b of the housing 302. The fourth face 304d can be disposed opposite the third face 304c. Other facial configurations can be used. The second phased array antenna 308b can be configured to transmit and receive radio frequency signals within a second radio frequency band. The second radio frequency band can be the same or different from the first radio frequency band. As an example, the second phased array antenna 308b can be configured to transmit and receive radio frequency signals at about 60 GHz. As a further example, a fourth radio 307d can be disposed in the housing 302 and in communication with the second phased array antenna 308b. The fourth radio 307d can be configured to cause transmission of a directional radio frequency signal via the second phased array antenna 308b in a EHF frequency band such as a band comprising 60 GHz. The third radio 307c can be configured to adjust the phased transmission of radio signals via the first phased array antenna 308a to control beamforming for signal reception and/or transmission.

In an aspect, a processor 310 can be disposed in the housing 302 and in communication with one or more of the radios 307a, 307b, 307c, 307d. The processor 310, and other components of the node 300, can receive electrical power via a power supply 312 such as a stored energy source or a conduit for receiving power from an external source. The processor can be configured to manage one or more radio frequency signals transmitted and received via the antennas 306a, 306b, 308a, 308b. As an example, a device (e.g., user device 102) can be configured to communicate with node 300 wirelessly via the first radio frequency band (e.g., 2.4 GHz, 5 GHz, etc.). One or more of the planar antenna arrays 306a, 306b can receive signals from the device, which can be transmitted to the processor 310. The processor 310 can process the received signals and can generate information that is transmitted to one or more of the radios 307c, 307d for transmission via one or more of the phased array antennas 308a, 308b. Similarly, signals received via one or more of the phased array antennas 308a, 308b can be transmitted to the processor 310. The processor 310 can process the received signals and can generate information that is transmitted to one or more of the radios 307a, 307b for transmission via one or more of the planar antenna arrays 306a, 306b.

Figure 4A:
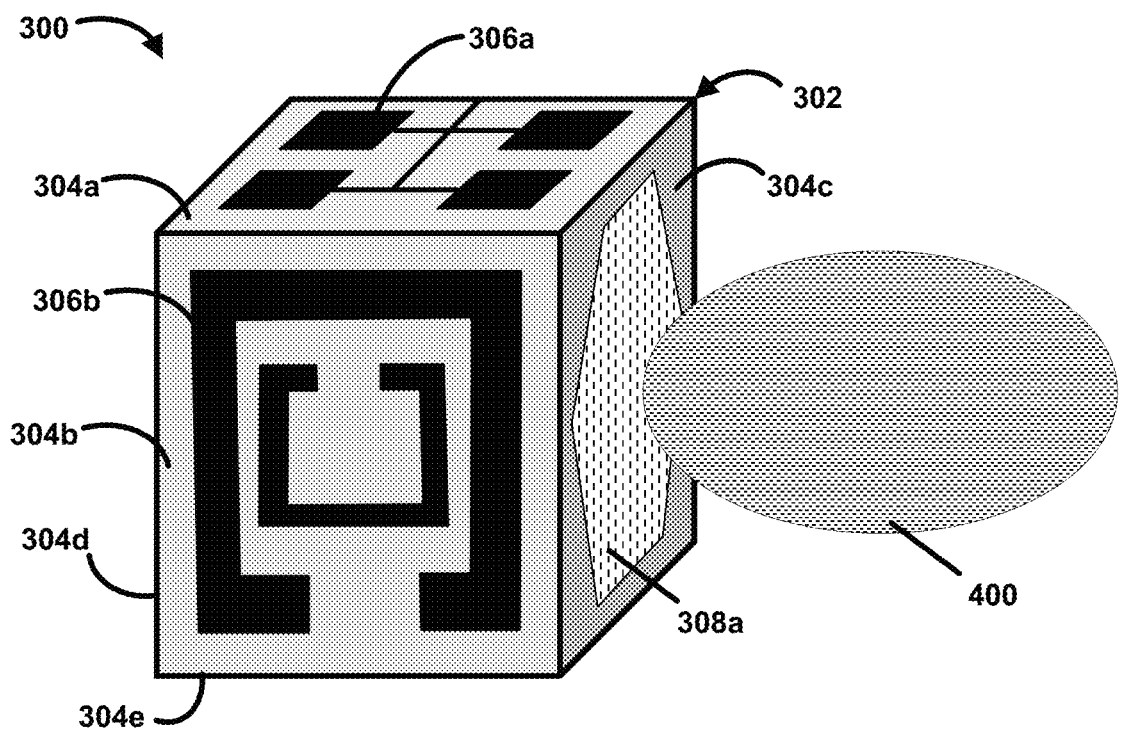
FIG. 4A is a diagrammatic front perspective view of the node of FIG. 3A showing a first transmission pattern.
Figure 4B:
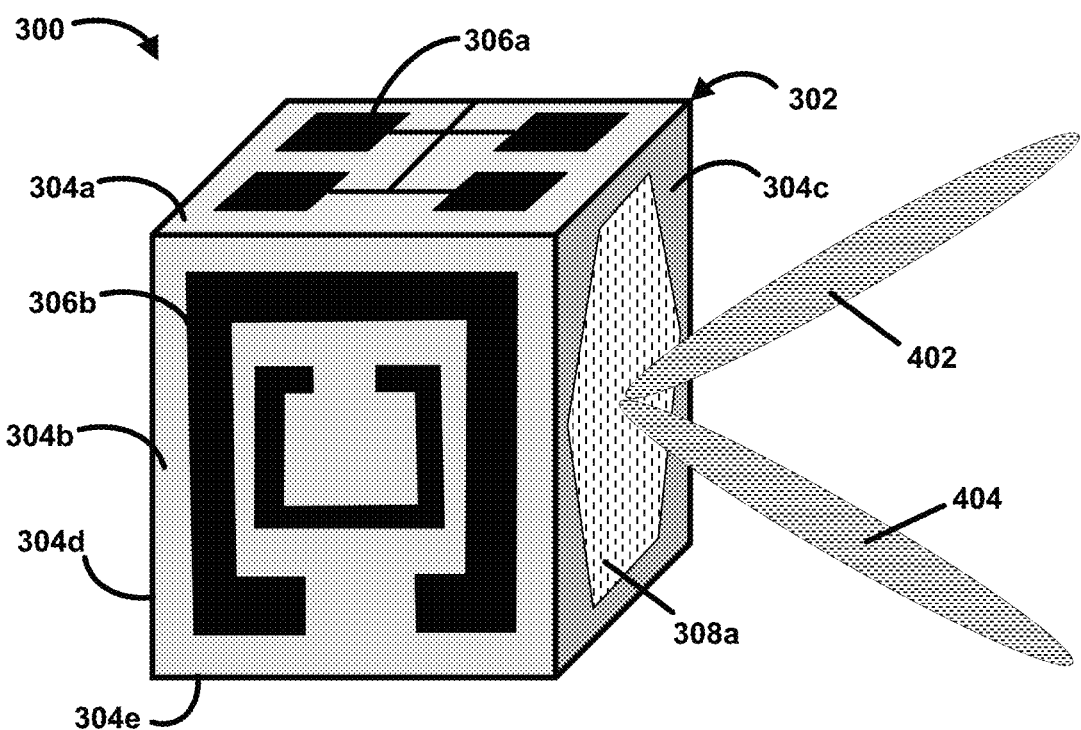
FIG. 4B is a diagrammatic front perspective view of the node of FIG. 3A showing a second transmission pattern.

As an example, the node 300 can communicate data between other nodes 300 via the second radio frequency band (e.g., 60 GHz) and with mobile wireless devices via the first radio frequency band. The communication via the second frequency band can be directional transmission, such as through beamforming techniques using the phased array antennas 308a, 308b. Such a transmission can be directed to minimize signal interference, for example, by physical barriers such as walls, moving objects or people, and/or signal inferences. For example, as illustrated in FIG. 4A, the node 300 can be configured to provide a first transmission pattern 400, such as a hemispherical transmission pattern. Other transmission patterns can be formed. As a further example, multiple orbs or directional pencil transmission patterns 402, 404 can be formed, as illustrated in FIG. 4B. Shape, size, and directionality of the transmissions can be controlled via the phased array antennas 308a, 308b.

Figure 5:
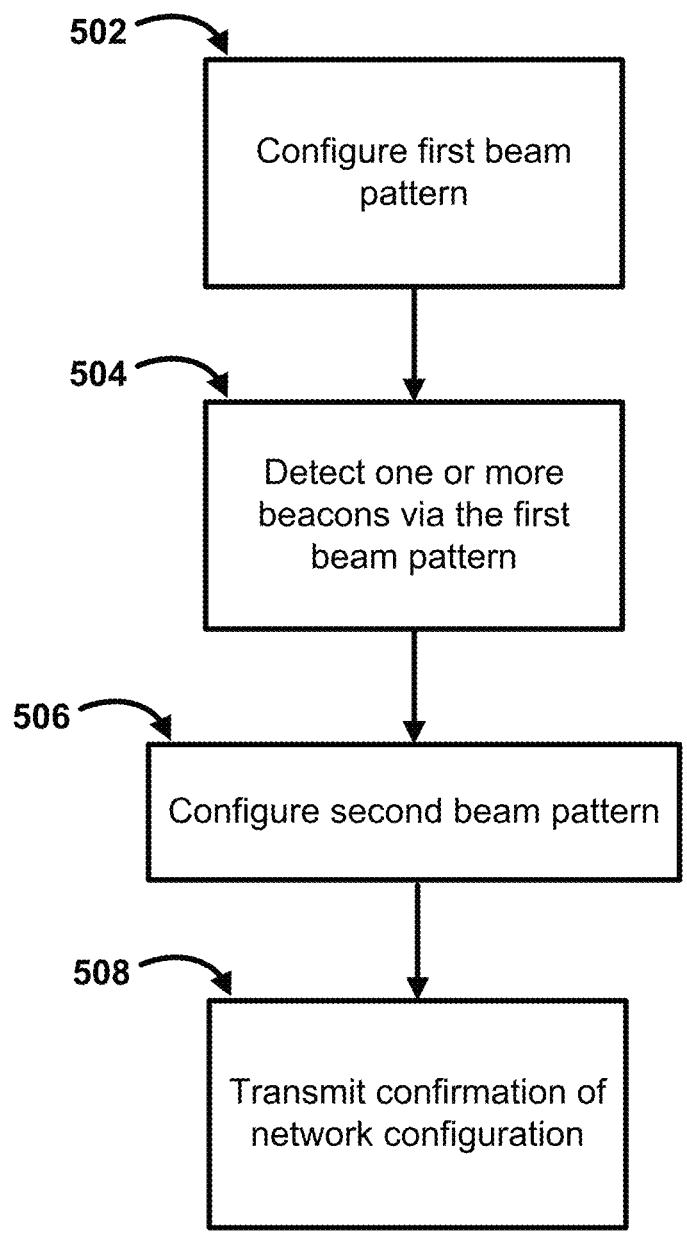
FIG. 5 is a flow chart of an example method.

An exemplary method for configuring one or more nodes of a network is shown in FIG. 5. In operation or step 502, a first node (e.g., node 300) can be configured to provide a first transmission pattern such as a broad coverage pattern (e.g., hemispherical transmission pattern, first transmission pattern 400 (FIG. 4A)). The first transmission pattern can be provided via a phased array antenna. The first transmission pattern can be broadcast over a EHF band such as a band including 60 GHz. The first transmission pattern can be configured to cover a wide spatial area (e.g., multi-directional) and to detect various signals (e.g., beacons). Other transmission patterns can be formed.

In operation or step 504, one or more beacons can be detected via the first transmission pattern. The beacons can be transmitted from one or more second nodes such as access nodes, gateways, and the like. The beacon can comprise a beacon frame. The beacon can comprise information to facilitate a connection between the first node and the one or more second nodes. The beacon can be broadcast via various radio frequency bands (e.g., EHF, 60 GHz, etc.) to be discovered by the first node, when the beacon is within the first transmission pattern. As an example, internodal beacons can be exclusively broadcast over a select radio frequency band (e.g., EHF, 60 GHz, etc.) that may not be directly accessible to other devices such as user devices. As a further example, messages can be sent between the access nodes and/or the gateway of a network to confirm when a particular beacon has been discovered and/or communication has been lost. Such messages can include identifiers (E.g., MAC address) of the particular node. Other information can be included in the internodal messages.

In operation or step 506, the first node can be configured to provide a second transmission pattern such as a directional coverage pattern (e.g., pencil transmission patterns 402, 404 (FIG. 4B)). The second transmission pattern can be provided via a phased array antenna. The second transmission pattern can be broadcast over an EHF band such as a band including 60 GHz. The second transmission pattern can be dynamically adjusted to optimize a signal strength between two or more nodes. As an example, the shape, size, and/or directionality of the second transmission pattern can be adjusted until a signal strength is measured above a predetermined threshold. As another example, the shape, size, and/or directionality of the second transmission pattern can be adjusted until a signal strength is maximized. As the parameters of the second transmission pattern are adjusted, a signal strength (e.g., received signal strength indication (RSSI), signal-to-noise ratio, etc.) can be measured. When the signal strength exceeds a threshold, the parameters can be maintained until the signal strength is reduced, for example via interference. As an example, signal strength may be optimized when two directional transmissions from separate nodes are aligned to intersect. Other configuration may result in optimization and/or exceeding a threshold of acceptable signal strength. In certain aspects, each node can execute an optimization process specific to that node. For example, once a first node has established a connection with a second node, the second node may confirm optimization with the first node and may attempt to establish additional connections with other access nodes or gateways.

In operation or step 508, the first node can transmit a confirmation to one or more nodes that a connection has been established therebetween. As such, a mesh network of two or more nodes can be dynamically established and updated to maintain optimal signal strength therebetween, using directional beamforming. This process can be repeated for any number of access nodes and gateways. As an example, each pair of nodes/gateways can establish an optimized connection with the other node/gateway by dynamically adjusting the directional transmissions. As another example, messages can be sent between the access nodes and/or the gateway of a network to confirm an established connection and/or optimization parameters of the established connect. As another example, message relating to interference with the established internodal connections and/or lost connections may be sent via a select radio frequency band (e.g., EHF, 60 GHz, etc.) that may not be directly accessible to other devices such as user devices. In certain aspects, when a connection is interrupted or lost, one or more of the operations discussed in reference to FIG. 5 can be repeated to re-establish the connection. As an example, an offline message can be broadcast by one or more nodes that are unable to detect other beacons. When another node receives the offline message, routing of the backhaul network traffic can be adjusted based at least in part on the indication that one or more nodes are currently offline. As the offline node comes back online, routing procedures can be adjusted again.

Figure 6:
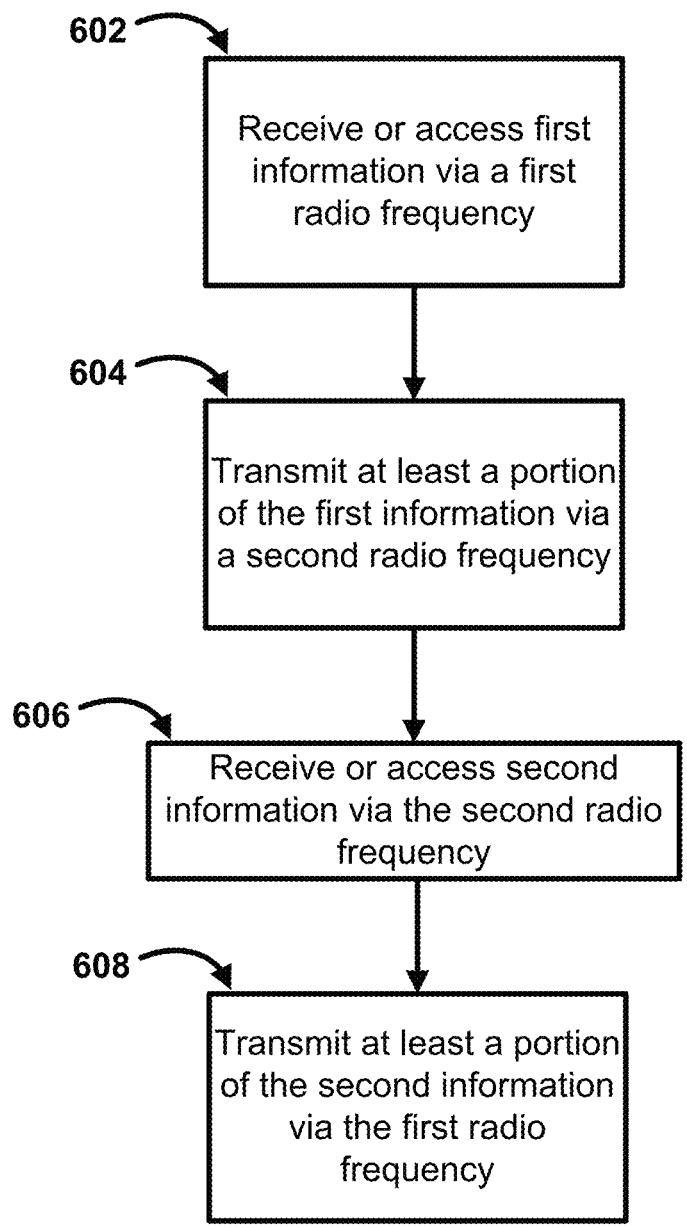
FIG. 6 is a flow chart of an example method.

An exemplary method is shown in FIG. 6. In operation or step 602, first information can be received or accessed via a first radio frequency. As an example, the first radio frequency band can comprise 2.4 GHZ or 5 GHZ, or both. Other frequency bands can be used. The first information can comprise authentication data, control data, video data, voice data, Internet bound data, etc. As an example, the first information can comprise one or more of a device identifier associated with the source of the first information and authentication information. The first information can be received or accessed by an access node of a first network such as a local area network (e.g., premises network). As an example, the access node facilitates access to a second network (e.g., wide area network) external to the first network by a source of the first information. As a further example, the access node can be configured as part of a mesh network with other access nodes and/or a gateway node.

In operation or step 604, at least a portion of the first information can be transmitted via a second radio frequency band. The second radio frequency band can be different from the first radio frequency band. As an example, the second radio frequency band can comprise 60 GHz. Other frequencies and bands can be used. In an aspect, the access node can transmit at least the portion of the first information to a gateway node of the premises network. The gateway node can be in communication with the second network and can be configured to transmit at least the portion of the first information to the second network. As an example, at least the portion of the first information can be transmitted to the gateway node via one or more intervening access nodes. Such intervening communication can be via the second radio frequency band. For example, a plurality of the access nodes can be configured as a mesh network to manage the backhaul of data to/from the gateway node, which can then manage data passing between the mesh network and a second network.

In operation or step 606, second information can be received or accessed via the second radio frequency band. As an example, one or more access nodes can receive the second information. The second information can comprise authentication data, control data, video data, voice data, Internet bound data, etc. The second information can comprise a network identifier associated with the source of the first information to facilitate communication with one or more networks. In an aspect, at least a portion of the second information is sourced via the second network. As an example, the gateway node can receive at least a portion of the second information via the second network and can transmit at least the portion of the second information to one or more access nodes via the second radio frequency band. In an aspect, the communication via the second frequency band can be directional communication, such as through beamforming techniques using a phased array antenna. As an example, each of the access nodes and the gateway node can be configured to transmit and/or receive radio signals via directional transmission. Such a transmission can be directed to minimize signal interference, for example, by physical barriers such as walls, moving objects or people, and/or signal inferences.

In operation or step 608, at least a portion of the received second information can be transmitted via the first radio frequency band. As an example, one or more access nodes can receive the portion of the second information and can transmit at least a portion of the second information to a source of the first information via the first radio frequency band.

Figure 7:
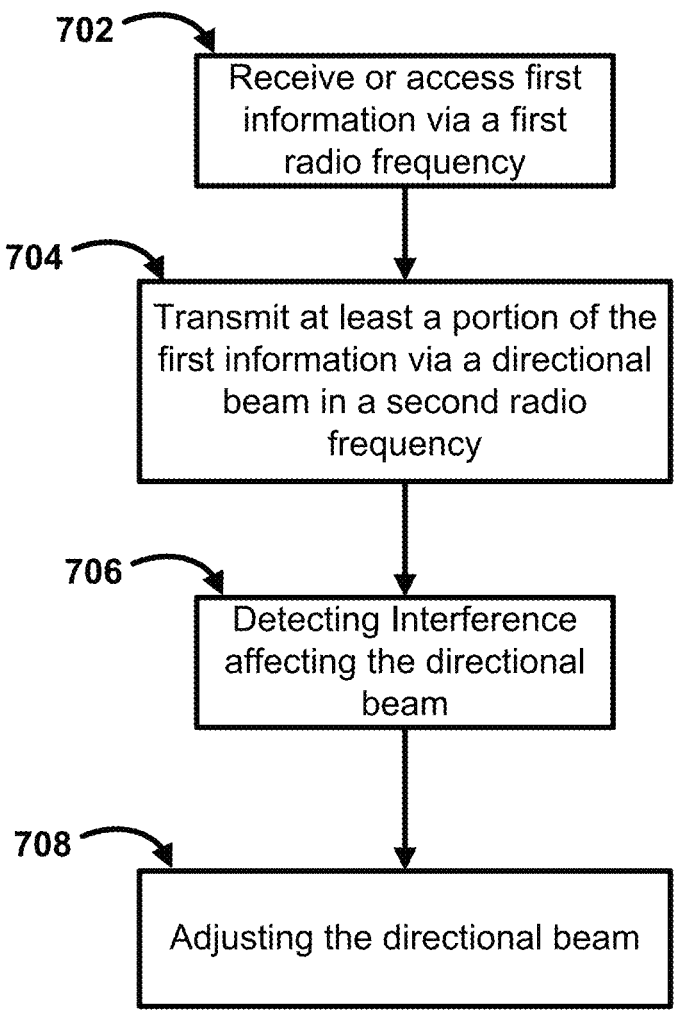
FIG. 7 is a flow chart of an example method.

An exemplary method is shown in FIG. 7. In operation or step 702, first information can be received or accessed via a first radio frequency. As an example, the first radio frequency band can comprise 2.4 GHZ or 5 GHZ, or both. Other frequency bands can be used. The first information can comprise authentication data, control data, video data, voice data, Internet bound data, etc. As an example, the first information can comprise one or more of a device identifier associated with the source of the first information and authentication information. The first information can be received or accessed by an access node of a first network such as a local area network (e.g., premises network). As an example, the access node facilitates access to a second network (e.g., wide area network) external to the first network by a source of the first information. As a further example, the access node can be configured as a mesh network with other access nodes and/or a gateway node.

In operation or step 704, at least a portion of the first information can be transmitted via a directional transmission within second radio frequency band. The second radio frequency band can be different from the first radio frequency band. As an example, the second radio frequency band can comprise a EHF band such as a band including 60 GHz. Other frequencies and bands can be used. In an aspect, the access node can transmit at least the portion of the first information to a gateway node of the premises network. The gateway node can be in communication with the second network and can be configured to transmit at least the portion of the first information to the second network. As an example, at least the portion of the first information can be transmitted to the gateway node via one or more intervening access nodes. Such intervening communication can be via the second radio frequency band. For example, a plurality of the access nodes can be configured a mesh network to manage the backhaul of data to/from the gateway node, which can then manage data passing between the mesh network and a second network. Communication via the second frequency band can be directional communication, such as through beamforming techniques using phased array antenna. As an example, each of the access nodes and the gateway node can be configured to transmit and/or receive radio signals via directional transmission. Such a transmission can be directed to minimize signal interference, for example, by physical barriers such as walls, moving objects or people, and/or signal inferences.

In operation or step 706, interference affecting the directional transmission can be detected. In operation or step 708, the directional transmission can be adjusted to reduce the effect of the detected interference on the transmission of at least the portion of the first information. Such adjustment can be based on a dynamic process such as the method illustrated in FIG. 5. As an example, the directional transmission can be adjusted until a detected signal strength is above a predetermined threshold. Such signal strength can be measured by signal-to-noise ratios, received signal strength indication, and or other signal strength metrics.

Figure 8:
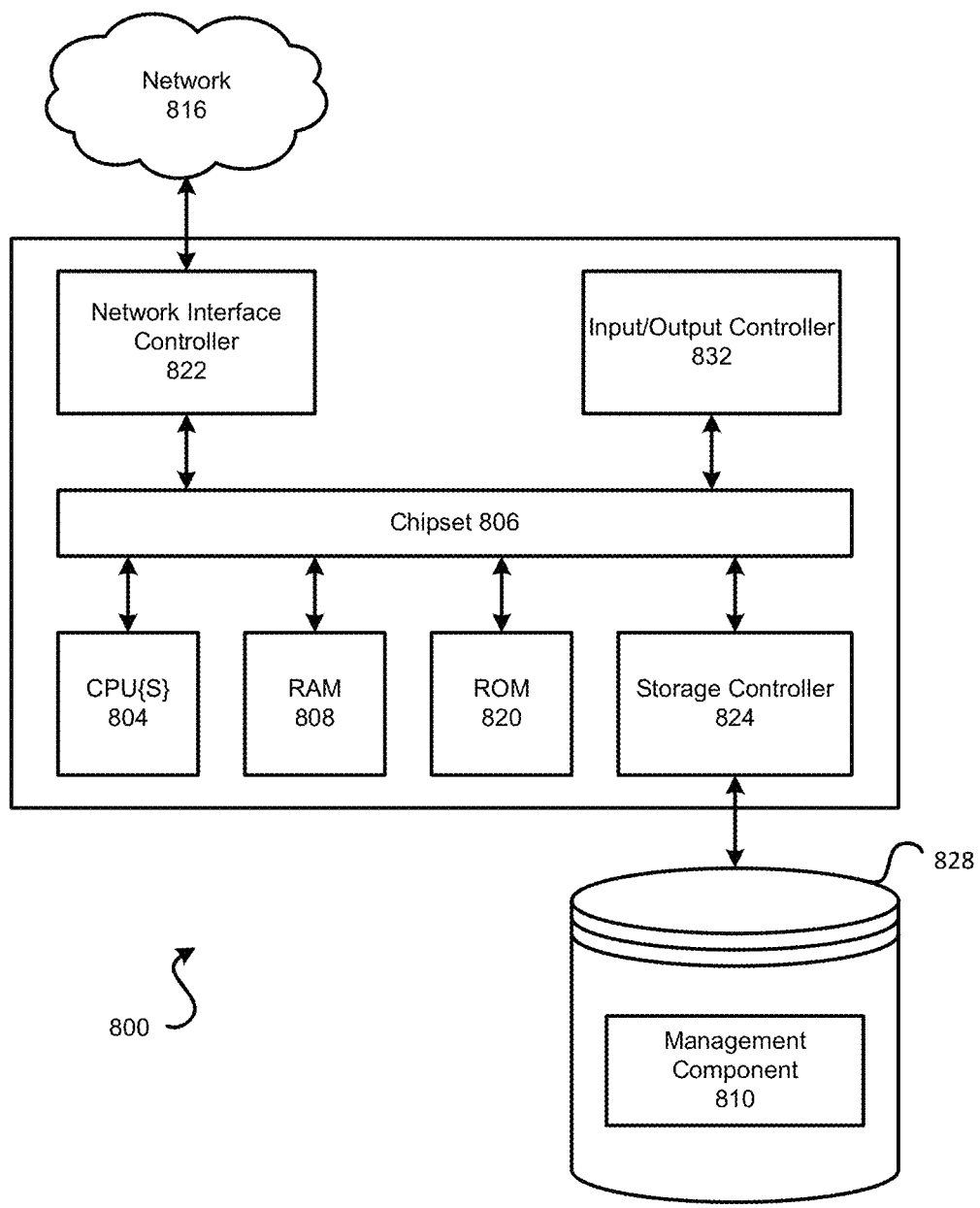
FIG. 8 is a block diagram of an example computer.

FIG. 8 depicts a computer that may be used in aspects, such as the computers depicted in FIG. 1. With regard to the example architecture of FIG. 1, the user device 102 and the computing device 104 may each be implemented in an instance of a computer 800 of FIG. 8. The computer architecture shown in FIG. 8 illustrates a conventional server computer, workstation, desktop computer, laptop, tablet, network appliance, PDA, e-reader, digital cellular phone, or other computing node, and may be utilized to execute any aspects of the computers described herein, such as to implement the operating procedures of FIGS. 5-7.

The computer 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPUs 804 may be standard programmable processors that perform arithmetic and logical operations necessary for the operation of the computer 800.

The CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 806 may provide an interface between the CPUs 804 and the remainder of the components and devices on the baseboard. The chipset 806 may provide an interface to a random access memory (RAM) 808 used as the main memory in the computer 800. The chipset 806 may further provide an interface to a computer-readable storage medium, such as a read-only memory (ROM) 820 or non-volatile RAM (NVRAM) (not shown), for storing basic routines that may help to start up the computer 800 and to transfer information between the various components and devices. ROM 820 or NVRAM may also store other software components necessary for the operation of the computer 800 in accordance with the aspects described herein.

The computer 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. The NIC 822 may be capable of connecting the computer 800 to other computing nodes over the network 816. It should be appreciated that multiple NICs 822 may be present in the computer 800, connecting the computer to other types of networks and remote computer systems.

The computer 800 may be connected to a mass storage device 828 that provides non-volatile storage for the computer. The mass storage device 828 may store system programs, application programs, other program modules, and data, which have been described in greater detail herein. The mass storage device 828 may be connected to the computer 800 through a storage controller 824 connected to the chipset 806. The mass storage device 828 may consist of one or more physical storage units. The storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computer 800 may store information to the mass storage device 828 by issuing instructions through the storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 828 by detecting the physical states or characteristics of one or more particular locations within the physical storage units.

In addition to the mass storage device 828 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can may be used to store the desired information in a non-transitory fashion.

The mass storage device 828 may store an operating system utilized to control the operation of the computer 800. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. It should be appreciated that other operating systems may also be utilized. The mass storage device 828 may store other system or application programs and data utilized by the computer 800, such as the management component 810 and/or the other software components described above.

The mass storage device 828 or other computer-readable storage media may also be encoded with computer-executable instructions, which, when loaded into the computer 800, transforms the computer from a general-purpose computing system into a special-purpose computer capable of implementing the aspects described herein. These computer-executable instructions transform the computer 800 by specifying how the CPUs 804 transition between states, as described above. The computer 800 may have access to computer-readable storage media storing computer-executable instructions, which, when executed by the computer 800, may perform operating procedures depicted in FIGS. 5-7.

The computer 800 may also include an input/output controller 832 for receiving and processing input from a number of input devices, such as a keyboard, a mouse, a touchpad, a touch screen, an electronic stylus, or other type of input device. Similarly, the input/output controller 832 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

As described herein, a computing node may be a physical computing node, such as the computer 800 of FIG. 8. A computing node may also be a virtual computing node, such as a virtual machine instance, or a session hosted by a physical computing node, where the computing node is configured to host one or more sessions concurrently.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system comprising:
at least one user device; and
a plurality of access nodes located at a premises, wherein the plurality access nodes form a premises wireless mesh network located at the premises, and wherein the premises wireless mesh network is configured to enable access, by the at least one user device, to a second network,
wherein a first access node of the plurality of access nodes is configured to:
receive, from the at least one user device and via a first communication channel comprising a first radio frequency band and using a first protocol, first information comprising one or more of a device identifier associated with the user device or authentication information, wherein each of the plurality of access nodes are configured to communicate with each other via a second communication channel comprising a second radio frequency band different from the first radio frequency band;

send to a second access node of the plurality of access nodes and via the second communication channel using a first directional beamforming transmission at the premises and using a second protocol different from the first protocol, the first information and wherein the second access node is configured to:

send, to a gateway node of the premises wireless mesh network and via the second communication channel using a second directional beamforming transmission at the premises, the first information, wherein the gateway node is configured to communicate with the second network and to manage communication between the premises wireless mesh network and the second network, and wherein the first access node is further configured to:

receive second information from the gateway node via the second communication channel; and send to the user device and via the first communication channel, at least a portion of the second information.

2. The system of claim 1, wherein the second radio frequency band comprises an extremely high frequency (EHF) band.

3. The system of claim 1, wherein the second access node is configured to send, to the gateway node and via the second communication channel, the first information by forming a transmission using a phased array antenna to direct the transmission of the first information to the gateway node.

4. The system of claim 3, wherein the phased array antenna is configured to:

adjust the formed transmission to reduce detected interference.

5. The system of claim 1, wherein send, via the second communication channel, the first information comprises sending at least the portion of the first information to the gateway node via one or more intervening access nodes of the plurality of access nodes of the premises wireless mesh network.

6. The system of claim 1, wherein the user device is not configured to communicate, via the first communication channel, directly with the gateway node.

7. A non-transitory computer-readable medium storing instructions that, when executed, cause:

receiving, from a user device and by a first access node of a plurality of access nodes located at a premises, first information, wherein the plurality of access nodes form a premises wireless mesh network located at the premises, wherein the receiving the first information is via a first communication channel comprising a first radio frequency band and using a first protocol, wherein each of the plurality of access nodes are configured to communicate with each other via a second communication channel comprising a second radio frequency band different from the first radio frequency band, wherein the first information comprises one or more of a device identifier associated with the user device or authentication information, and wherein the premises wireless mesh network is configured to enable access, by the user device, to a second network;

sending, by the first access node and to a second access node of the plurality of access nodes, the first information, wherein the sending the first information is via the second communication channel using a first directional beamforming transmission at the premises and using a second protocol different from the first protocol;

sending, by the second access node and to a gateway node of the premises wireless mesh network, the first information, wherein the sending the first information is via the second communication channel using a second directional beamforming transmission at the premises; and wherein the gateway node is in communication with the second network and is configured to manage communication between the premises wireless mesh network and the second network;

receiving, by the first access node, second information from the gateway node via the second communication channel; and sending, to the user device, by the first access node, and via the first communication channel, at least a portion of the second information.

8. The non-transitory computer-readable medium of claim 7, wherein the second radio frequency band comprises an extremely high frequency (EHF) band.

9. The non-transitory computer-readable medium of claim 7, wherein the sending, via the second communication channel, the first information comprises forming a transmission using a phased array antenna to direct the transmission of the first information to the gateway node.

10. The non-transitory computer-readable medium of claim 9, wherein the instructions, when executed, further cause:

adjusting the formed transmission via the phased array antenna to reduce detected interference.

11. The non-transitory computer-readable medium of claim 7, wherein the sending, via the second communication channel, the first information comprises sending at least the portion of the first information to the gateway node via one or more intervening access nodes of the plurality of access nodes of the premises wireless mesh network.

12. A system comprising:

at least one user device; and a plurality of access nodes located at a premises, wherein the plurality of access nodes are configured as a premises mesh network, and wherein a first access node of the plurality of access nodes is configured to:

receive, from the at least one user device, via a first radio frequency band and based on a beacon sent by the first access node via a first transmission pattern, first information comprising a device identifier associated with the user device, wherein each of the plurality of access nodes are configured to communicate with each other via a second radio frequency band different from the first radio frequency band;

send, to a gateway node, at least a portion of the first information, wherein the at least a portion of the first information is sent via a directional beamforming transmission in the second radio frequency band at the premises, wherein the directional beamforming transmission is based on a second transmission pattern different from the first transmission pattern, and wherein the gateway node is configured to enable communication between the premises mesh network and a second network;

detect interference affecting the directional beamforming transmission; and adjust the directional beamforming transmission at the premises to reduce an effect of the detected interference on the sending at least the portion of the first information.

13. The system of claim 12, wherein the adjusting the directional beamforming transmission comprises aligning the directional beamforming transmission with a second directional beamforming transmission generated from the gateway node.

14. The system of claim 12, wherein the second radio frequency band comprises an extremely high frequency (EHF) band.

15. The system of claim 12, wherein the sending, via the directional beamforming transmission in the second radio frequency band, at least the portion of the first information comprises forming a transmission using a phased array antenna to direct the transmission of at least the portion of the first information to the gateway node.

16. A non-transitory computer-readable medium storing instructions that, when executed, cause:
    receiving, from a user device and by a first access node of a plurality of access nodes, first information, wherein the plurality of access nodes are located at a premises and configured as a premises mesh network, wherein the first information is received via a first radio frequency band and based on a beacon sent via a first transmission pattern and by the first access node, wherein each of the plurality of access nodes are configured to communicate with each other via a second radio frequency band different from the first radio frequency band, wherein the first information comprises a device identifier associated with the user device;
    sending, by the first access node and to a gateway node, at least a portion of the first information via a directional beamforming transmission in the second radio frequency band at the premises, wherein the directional beamforming transmission is based on a second transmission pattern different from the first transmission pattern, and wherein the gateway node is configured to enable communication between the premises mesh network and a second network;
    detecting interference affecting the directional beamforming transmission; and
    adjusting the directional beamforming transmission at the premises to reduce an effect of the detected interference on the sending at least the portion of the first information.

17. The non-transitory computer-readable medium of claim 16, wherein the adjusting the directional beamforming transmission comprises aligning the directional beamforming transmission with a second directional beamforming transmission generated from the gateway node.

18. The non-transitory computer-readable medium of claim 16, wherein the second radio frequency band comprises an extremely high frequency (EHF) band.

19. The non-transitory computer-readable medium of claim 16, wherein the sending, via the directional beamforming transmission in the second radio frequency band, at least the portion of the first information comprises forming a transmission using a phased array antenna to direct the transmission of at least the portion of the first information to the gateway node.

20. A system comprising:
    at least one user device; and
    a plurality of access nodes located at a premises and configured as a premises mesh network,
    wherein a first access node of the plurality of access nodes comprises one or more planar antennas configured to:
        receive, from the user device and via a first radio frequency band, first information, wherein each of the plurality of access nodes are configured to communicate with each other via a second radio frequency band different from the first radio frequency band and wherein the second radio frequency band comprises an extremely high frequency (EHF) band;
        send to a gateway node, at least a portion of the first information via the second radio frequency band using a first directional beam forming transmission at the premises;
        receive second information from the gateway node via the second radio frequency band, wherein the gateway node is configured to enable communication between the premises mesh network and a second network; and
        send, to the user device, via the first radio frequency band using a second directional beamforming transmission at the premises, at least a portion of the second information.

21. The system of claim 20, wherein the at least the portion of the first information is sent via the second radio frequency band by forming a transmission using the one or more phased array antennas to direct the transmission of at least the portion of the first information to another access node of the premises mesh network or the gateway node.

22. The system of claim 21, wherein the one or more phased array antennas are further configured to adjust the formed transmission to reduce detected interference.

23. A non-transitory computer-readable medium storing instructions that, when executed, cause:
    receiving, from a user device and via a first radio frequency band, first information, wherein the first information is received via one or more planar antennas of a first access node of a plurality of access nodes, wherein the plurality of access nodes are located at a premises and configured as a premises mesh network, wherein each of the plurality of access nodes are configured to communicate with each other via a second radio frequency band different from the first radio frequency band and wherein the second radio frequency band comprises an extremely high frequency (EHF) band;
    sending, via one or more phased array antennas of the first access node and to a gateway node, at least a portion of the first information via the second radio frequency band using a first directional beam forming transmission at the premises;
    receiving, via the one or more phased array antennas of the first access node, second information from the gateway node via the second radio frequency band, wherein the gateway node is configured to enable communication between the premises mesh network and a second network; and
    sending, to the user device, via the one or more planar antennas of the first access node and via the first radio frequency band using a second directional beamforming transmission at the premises, at least a portion of the second information.

24. The non-transitory computer-readable medium of claim 23, wherein the sending, via the second radio frequency band, at least the portion of the first information comprises forming a transmission using the one or more phased array antennas to direct the transmission of at least the portion of the first information to another access node of the premises mesh network or the gateway node.

25. The non-transitory computer-readable medium of claim 24, wherein the instructions, when executed, further cause adjusting the formed transmission via the one or more phased array antennas to reduce detected interference.

* * * * *